US012316233B2

(12) United States Patent
Shi et al.

(10) Patent No.: US 12,316,233 B2
(45) Date of Patent: May 27, 2025

(54) MODULATION TO EXTEND ZERO-VOLTAGE SWITCHING MARGIN FOR DUAL-ACTIVE BRIDGE CONVERTER

(71) Applicant: Rivian IP Holdings, LLC, Plymouth, MI (US)

(72) Inventors: Yanjun Shi, Torrance, CA (US); Zahra Mohajerani, Los Angeles, CA (US); Lixiang Wei, Irvine, CA (US); Mohammad Nanda R. Marwali, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 148 days.

(21) Appl. No.: 17/984,092

(22) Filed: Nov. 9, 2022

(65) Prior Publication Data

US 2024/0154534 A1 May 9, 2024

(51) Int. Cl.
*H02M 3/335* (2006.01)
(52) U.S. Cl.
CPC ..... *H02M 3/33584* (2013.01); *H02M 3/3353* (2013.01)
(58) Field of Classification Search
CPC .......... H02M 1/12; H02M 1/123; H02M 1/44; H02M 3/335; H02M 3/3353; H02M 3/33573; H02M 3/33584; H02M 3/33592
See application file for complete search history.

(56) References Cited

U.S. PATENT DOCUMENTS

| 8,587,975 B2* | 11/2013 | Jain ..................... H02M 3/3376 363/17 |
| 11,855,545 B1* | 12/2023 | Mazurek ................. H02M 1/12 |
| 2015/0214854 A1* | 7/2015 | Gu ........................ H02M 5/458 363/36 |

OTHER PUBLICATIONS

Krismer et al., "Efficiency-optimized high-current dual active bridge converter for automotive applications," IEEE Transactions on Industrial Electronics, vol. 59, No. 7, pp. 2745-2760 (2012).

\* cited by examiner

*Primary Examiner* — Gary L Laxton
(74) *Attorney, Agent, or Firm* — Haley Guiliano LLP (57) ABSTRACT

Systems and methods for controlling a dual active bridge converter are disclosed herein. A bus voltage of a dual active bridge (DAB) converter is detected and a first duty ratio of a primary bridge and a second duty ratio of a secondary bridge are determined, at least one of the first duty ratio and the second duty ratio are modified by adjusting at least one of a differential mode (DM) adjustment variable and a common mode (CM) adjustment variable based on the detected bus voltage. A plurality of switch control signals, which are provided to respective switches of the primary bridge and the secondary bridge, are caused to switch according to a time-based switching sequence based on the first duty ratio and the second duty ratio.

19 Claims, 6 Drawing Sheets

MODULATION TO EXTEND ZERO-VOLTAGE SWITCHING MARGIN FOR DUAL-ACTIVE BRIDGE CONVERTER

INTRODUCTION

The present disclosure relates to dual active bridge (DAB) converters and, more particularly, to systems and related processes for controlling a DAB converter in a manner that extends zero-voltage switching (ZVS) margin and reduces switching losses in the DAB converter.

SUMMARY

Dual active bridge converters are utilized to provide direct current-to-direct current (DC-DC) conversion for a multitude of applications. One such application is an electric vehicle charging station, in which a dual active bridge converter receives a DC voltage derived from an AC power grid, converts the received DC voltage to another DC voltage, and provides the converted DC voltage to a charging port of an electric vehicle. Another such application is in an electric vehicle, in which a DAB converter receives a DC voltage derived from the vehicle battery, converts the received DC voltage to another DC voltage, and provides the converted DC voltage at an output port of an electric vehicle or to power systems of the electric vehicle. In one approach, a triple phase shift (TPS) modulation scheme is used to operate the DAB converter during light load conditions to try to achieve ZVS and zero current switching (ZCS). However, conventional DAB converters may not achieve ZVS under a wide operation range (e.g., due to gate jitter, transformer current bias, unsymmetric switching delay, etc.). Additionally, for certain DAB converters (e.g., using wide bandgap (WBG) based power semiconductor switches), ZCS may reduce the turn-off time of the switch, thereby increasing switching loss when the complementary switch of the same phase leg turns on.

For improved efficiency, the present disclosure provides systems and methods for controlling a DAB converter (e.g., a DC-DC converter) to increase efficiency by extending ZVS and avoiding ZCS. For example, the present disclosure utilizes at least one of a differential mode (DM) adjustment variable and a common mode (CM) adjustment variable to modify at least one of the primary side duty ratio and the secondary side duty ratio of the DAB converter (e.g., the inner phase shift angles of the DAB converter) to extend ZVS and avoid ZCS. By operating the DAB converter under these conductions, switching losses, temperature rise, electromagnetic interference (EMI), and failure rate may be reduced.

A method for operating a DAB converter including a primary bridge, a secondary bridge, and a transformer coupling the primary bridge to the secondary bridge, is provided. The method includes detecting a bus voltage of the DAB converter, determining a first duty ratio of the primary bridge and a second duty ratio of the secondary bridge, modifying at least one of the first duty ratio and the second duty ratio by adjusting at least one of a differential mode (DM) adjustment variable and a common mode (CM) adjustment variable based on the detected bus voltage, and causing a plurality of switch control signals, which are provided to respective switches of the primary bridge and the secondary bridge, to switch according to a time-based switching sequence based on the first duty ratio and the second duty ratio.

In some embodiments, modifying at least one of the first duty ratio and the second duty ratio may include modifying at least one of the first duty ratio and the second duty ratio such that a current of the transformer changes polarity before the secondary bridge switches off.

In some embodiments, the DM adjustment variable may be based on the detected bus voltage, a leakage inductance of the transformer, and a first gain, and the CM adjustment variable may be based on a dead time of the DAB converter and a second gain.

In some embodiments, the DM adjustment variable may be a product of a first gain and a ratio of a leakage inductance of the transformer to the detected bus voltage.

In some embodiments, the CM adjustment variable may be a product of a second gain and a dead time between interlocked switches of the primary bridge or the secondary bridge.

In some embodiments, the secondary bridge may switch off before the primary bridge while a polarity of the current of the transformer is opposite to a polarity of a secondary bus voltage of the secondary bridge.

In some embodiments, modifying at least one of the first duty ratio and the second duty ratio may include modifying at least one of the first duty ratio and the second duty ratio to avoid zero current switching (ZCS) of the DAB converter.

In some embodiments, modifying at least one of the first duty ratio and the second duty ratio may include modifying at least one of the first duty ratio and the second duty ratio such that, at each rising edge of a primary side voltage of the transformer, the current of the transformer is negative; at each falling edge of the primary side voltage of the transformer, the current of the transformer is positive; at each rising edge of a secondary side voltage of the transformer, the current of the transformer is positive; and at each falling edge of the secondary side voltage of the transformer, the current of the transformer is negative.

In some embodiments, detecting the bus voltage may include detecting a primary bus voltage of the primary bridge; detecting a secondary bus voltage of the secondary bridge; and selecting, as the detected bus voltage, the bus voltage having smaller voltage fluctuations among the primary bus voltage and the secondary bus voltage.

A method for operating a DAB converter including a primary bridge, a secondary bridge, and a transformer coupling the primary bridge to the secondary bridge, is provided. The method includes detecting a bus voltage of the DAB converter, determining when to turn off the primary bridge and the secondary bridge based on the detected bus voltage such that zero voltage switching (ZVS) is achieved for one or more switches of the primary bridge and the secondary bridge, and causing a plurality of switch control signals, which are provided to respective switches of the primary bridge and the secondary bridge, to switch according to a time-based switching sequence based on the determination.

In some embodiments, the method further includes switching off the secondary bridge before switching off the primary bridge.

In some embodiments, determining when to turn off the primary bridge and the secondary bridge may include determining a differential mode (DM) adjustment variable and a common mode (CM) adjustment variable, modifying at least one of a first duty ratio of the primary bridge and a second duty ratio of the secondary bridge based on the determined DM adjustment variable and the CM adjustment variable.

A system for controlling a dual active bridge (DAB) converter having a primary bridge, a secondary bridge, and a transformer coupling the primary bridge to the secondary bridge, is provided. The system includes a port of the DAB converter, a plurality of output ports coupled to switches of the DAB converter, and control circuitry coupled to the port and the plurality of output ports. The control circuitry is configured to detect a bus voltage of the DAB converter via the port, determine a first duty ratio of the primary bridge and a second duty ratio of the secondary bridge, modify at least one of the first duty ratio and the second duty ratio by adjusting at least one of a differential mode (DM) adjustment variable and a common mode (CM) adjustment variable based on the detected bus voltage; and cause a plurality of switch control signals, which are provided to respective switches of the primary bridge and the secondary bridge, to switch according to a time-based switching sequence based on the first duty ratio and the second duty ratio.

In some embodiments, the control circuitry may be configured to modify at least one of the first duty ratio and the second duty ratio by modifying at least one of the first duty ratio and the second duty ratio such that a current of the transformer changes polarity before the secondary bridge switches off.

In some embodiments, each of the switches of the DAB converter is a gallium nitride (GaN) based semiconductor or a silicon carbide (SiC) based semiconductor.

In some embodiments, the DM adjustment variable may be a product of a first gain and a ratio of a leakage inductance of the transformer to the detected bus voltage, and the CM adjustment variable may be a product of a second gain and a dead time between interlocked switches of the primary bridge or the secondary bridge.

In some embodiments, the secondary bridge may switch off before the primary bridge while a polarity of the current of the transformer is opposite to a polarity of a secondary bus voltage of the secondary bridge.

In some embodiments, the control circuitry may be configured to modify at least one of the first duty ratio and the second duty ratio by modifying at least one of the first duty ratio and the second duty ratio to avoid zero current switching (ZCS) of the DAB converter.

In some embodiments, the control circuitry may be configured to modify at least one of the first duty ratio and the second duty ratio by modifying at least one of the first duty ratio and the second duty ratio such that, at each rising edge of a primary side voltage of the transformer, the current of the transformer is negative; at each falling edge of the primary side voltage of the transformer, the current of the transformer is positive; at each rising edge of a secondary side voltage of the transformer, the current of the transformer is positive; and at each falling edge of the secondary side voltage of the transformer, the current of the transformer is negative.

In some embodiments, the control circuitry may be configured to detect the bus voltage by detecting a primary bus voltage of the primary bridge, detecting a secondary bus voltage of the secondary bridge, and selecting, as the detected bus voltage, the bus voltage having smaller voltage fluctuations among the primary bus voltage and the secondary bus voltage.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
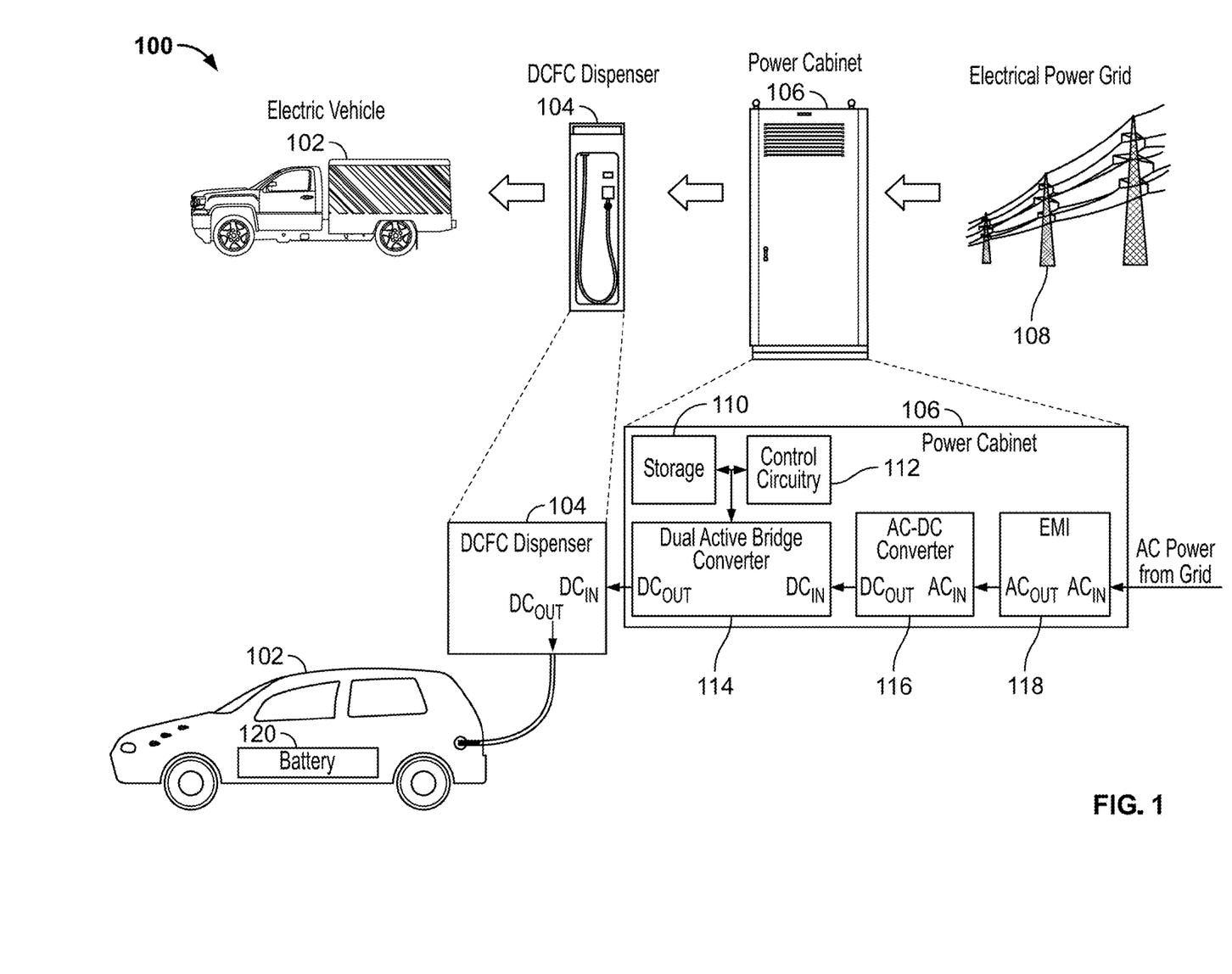
FIG. 1 shows an illustrative block diagram of an electric vehicle charging system including a DAB converter, in accordance with some embodiments of the disclosure.

FIG. 1 shows an illustrative block diagram of an electric vehicle charging system 100 including a dual active bridge converter, in accordance with some embodiments of the disclosure. System 100 includes electric vehicle 102, direct current fast charger (DCFC) dispenser 104, power cabinet 106, and electrical power grid 108. Electric vehicle 102 includes rechargeable battery 120. Power cabinet 106 includes storage 110, control circuitry 112, dual active bridge (DAB) converter 114, AC-DC converter 116, and electromagnetic interference filter (EMI) 118. Power cabinet 106 is coupled to electrical power grid 108 via one or more wired electrical power signal paths, by which electrical power grid 108 provides alternating current (AC) electrical power, such as in the form of a three-phase 480 volt (V) 60 hertz (Hz) signal, to power cabinet 106. EMI 118 performs filtering upon the AC electrical power received from electrical power grid 108 to mitigate high frequency electromagnetic noise, and outputs a filtered AC power signal to AC-DC converter 116. AC-DC converter 116 converts the filtered AC power signal received from EMI 118 into a DC signal, such as a signal fixed at a voltage in a range from 200 to 920 V and a maximum current of 500 amps (A) at a maximum power of 300 kilowatts (kW). However, this is only one example, an AC-DC converter 116 may provide any suitable voltage and current range. AC-DC converter 116 provides the DC signal to DAB converter 114, which converts the received DC signal into an output DC signal that is provided, by way of DCFC dispenser 104, to charge battery 120 via a charging port of electric vehicle 102. As described in further detail below, control circuitry 112, which is electrically coupled to storage 110 and DAB converter 114, is configured to control DAB converter 114 to transfer power to battery 120 in an efficient manner by modifying at duty ratios of DAB converter 114 by adjusting at least one of a DM adjustment variable and a CM adjustment variable based on a detected bus voltage of DAB converter 114, as described in further detail below.

Figure 2:
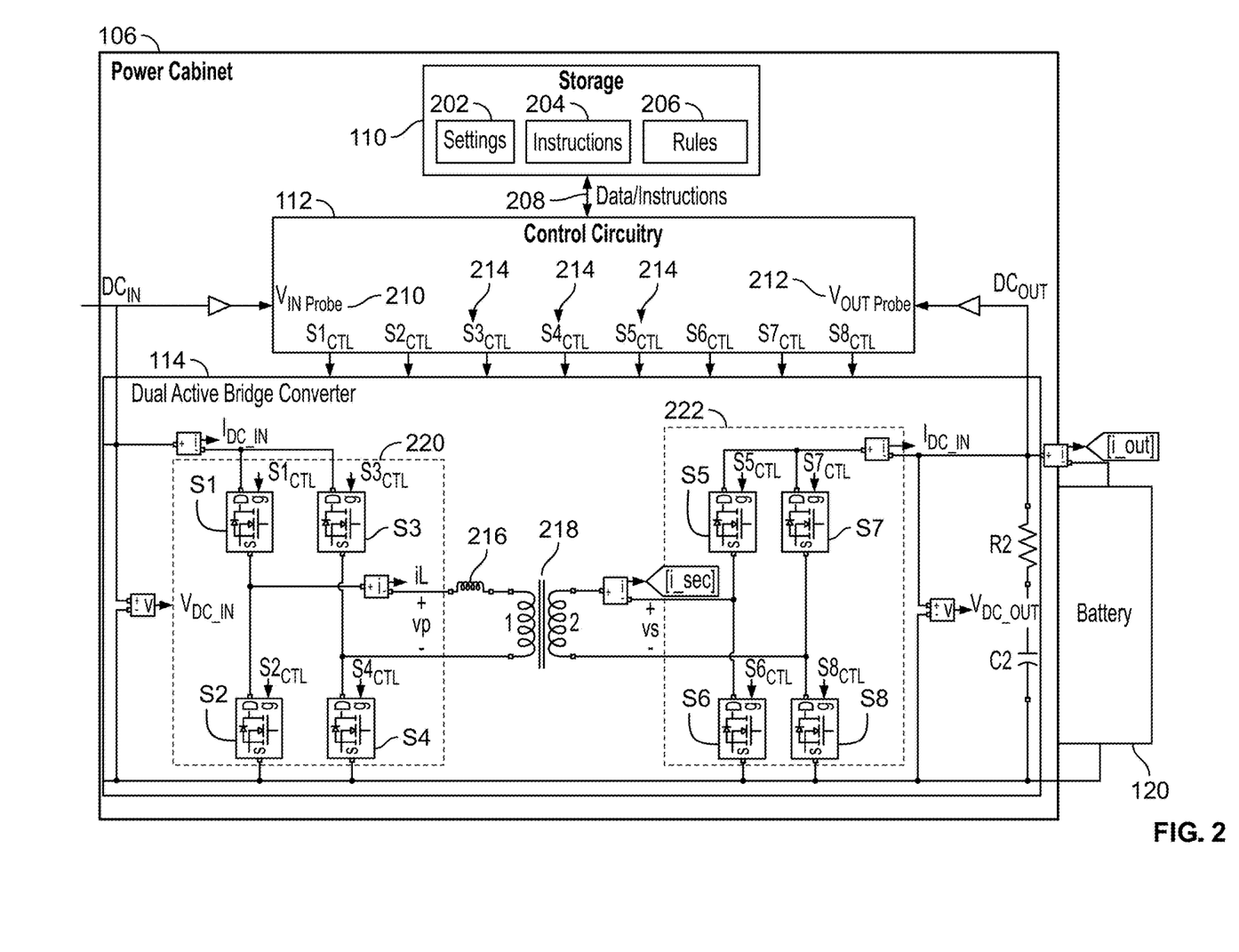
FIG. 2 is an illustrative block diagram showing additional details of some components of a power cabinet, in accordance with some embodiments of the disclosure.

FIG. 2 is an illustrative block diagram showing additional details of some components of power cabinet 106, in accordance with some embodiments of the disclosure. Storage 110 may be an electronic storage device. As referred to herein, the phrase "electronic storage device" or "storage device" should be understood to mean any device for storing electronic data, computer software, or firmware, such as random-access memory, read-only memory, solid state devices, or any other suitable fixed or removable storage devices, and/or any combination of the same. Storage 110 may be used to store various types of instructions, rules, and/or other types of data. In some embodiments, control circuitry 112 executes instructions for an application stored in storage 110. Specifically, control circuitry 112 may be instructed by the application to perform the functions discussed herein. In some implementations, any action performed by control circuitry 112 may be based on instructions received from the application. For example, the application may be implemented as software or a set of executable instructions that may be stored in storage 110 and executed by control circuitry 112.

Storage 110, in some aspects, stores settings 202, instructions 204, and rules 206. Example types of settings 202 may include ZVS margin settings, deadtime settings, gain values for adjustment variables, and/or other types of settings. Example types of rules 206 include computational constants (e.g., values of inductors and/or transformers of DAB converter 114), look-up-tables that define switching sequences, and/or other types of information or data. In some aspects, instructions 204 are executed by control circuitry 112 to implement steps of various methods described herein.

DAB converter 114 includes transformer 218, primary side bridge 220, and secondary side bridge 222. Primary side bridge 220 is coupled to a primary side of transformer 218 via series inductor 216. Secondary side bridge 222 is coupled to a secondary side of transformer 218. As used herein, the "primary side" or "primary bridge" of DAB converter 114 refers to the portion of DAB converter 114 appearing to the left of transformer 218 in FIG. 2, and the "secondary side" or "secondary bridge" of DAB converter 114 refers to the portion of DAB converter 114 appearing to the right of transformer 218 in FIG. 2. As used herein, Vp and Vs refer to the voltage on the primary side of transformer 218 and the voltage on the secondary side of transformer 218, respectively. DAB converter 114 also includes primary side switches S1, S2, S3, and S4 located on the primary side of DAB converter 114 and secondary side switches S5, S6, S7, and S8 located on the secondary side of DAB converter 114. Switches S1, S2, S3, S4, S5, S6, S7, and S8 may be any suitable type of electronic switch, such as a field effect transistor (FET)-based switch, that can be enabled (e.g., switched on/closed, during which current is permitted to be conducted between its source and drain terminal) or disabled (e.g., off/open, during which current is effectively prevented from being conducted between its source and drain terminal) by changing a logic level of the control signal provided to its gate terminal, for example from a logic-high to a logic-low. In some embodiments, switches S1-S8 may be wide bandgap (WBG) based power semiconductors, such gallium nitride (GaN) or silicon carbide (SiC) based semiconductors. In some embodiments, switches S1-S8 may comprise other types of metal-oxide-semiconductor field-effect transistors (MOSFETs) As shown, each of the switches S1-S8 includes an anti-parallel diode. Additionally, as understood by those skilled in the art, each of the switches S1-D8 includes an output capacitance (e.g., dependent on the operating voltage of the switch).

Control circuitry 112 includes storage interface port 208, first input port 210 (VIN Probe), second input port 212 ($V_{OUT\ Probe}$), and multiple output ports 214. Control circuitry 112 is configured to transmit and receive instructions, settings, rules, and/or other types of data to and from storage 110 via storage interface port 208. Control circuitry 112 is configured to sense an input voltage ($V_{IN}$) of DAB converter 114 via first input port 210. Control circuitry 112 is configured to sense an output voltage ($V_O$) of DAB converter 114 via second input port 212 ($V_{OUT\ Probe}$).

Output ports 214 include primary switching control ports $S1_{CTL}$, $S2_{CTL}$, $S3_{CTL}$, and $S4_{CTL}$, by which control circuitry 112 provides respective switch control signals to respective switching control ports $S1_{CTL}$, $S2_{CTL}$, $S3_{CTL}$, and $S4_{CTL}$ of primary side switches S1, S2, S3, and S4. Output ports 214 also include secondary switching control ports $S5_{CTL}$, $S6_{CTL}$, $S7_{CTL}$, and $S8_{CTL}$, by which control circuitry 112 provides respective switch control signals to respective switching control ports $S5_{CTL}$, $S6_{CTL}$, $S7_{CTL}$, and $S8_{CTL}$ of secondary side switches S5, S6, S7, and S8, respectively. Complete signal paths from switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 are omitted from FIG. 2 for clarity. Nonetheless, switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 are indeed coupled to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 via respective signal paths. As described in further detail below, in some aspects, control circuitry 112 is configured to cause switch control signals (e.g., switch control signals $S1_{CTL}$, $S2_{CTL}$, $S3_{CTL}$, $S4_{CTL}$ of primary side bridge 220, and/or switch control signals $S5_{CTL}$, $S6_{CTL}$, $S7_{CTL}$, and $S8_{CTL}$ of secondary side bridge 222) to switch according to a switching sequence that extends ZVS over a wide operation range, while avoiding ZCS.

In some embodiments, types of switches and/or switch configurations that differ from those shown in FIG. 2 may be utilized (e.g., switches with source and drain terminals located in positions that are the opposite of those shown in FIG. 2, active-high switches that are enabled with a logic-high gate voltage, active-low switches that are enabled with a logic-low gate voltage, or the like). The particular switches and configurations and logic levels shown and described herein are provided as illustrative examples. The principles herein apply similarly to other types of switches and/or switch configurations. Unless otherwise indicated herein, the switches relating to the examples described herein are active-high switches that are enabled (e.g., activated) with a logic-high gate voltage and are disabled (e.g., inactivated) with a logic-low gate voltage.

Although a power cabinet is illustrated and described, it should be understood that DAB converter 114 may be used for any power converter that requires isolation and have direct current (DC) as input, output, or middle stage, such as an on-board charger in an electric vehicle or for an energy storage system.

Figure 3:
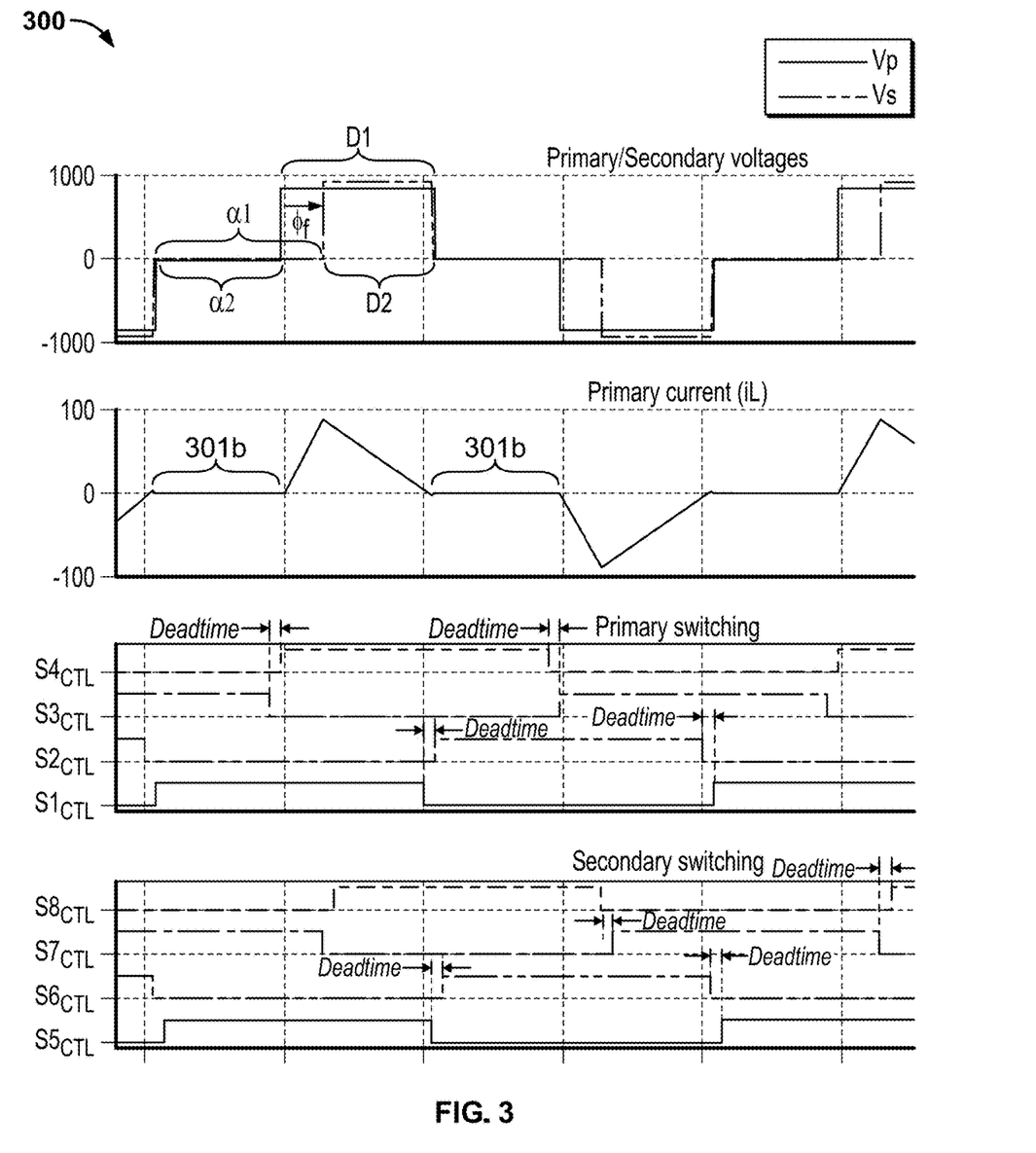
FIG. 3 depicts an illustrative timing diagram of a PWM switching pattern of switch control signals, and of primary current (iL), primary (Vp) and secondary (Vs) voltages of a DAB converter, in accordance with controlling the DAB converter by a TPS modulation scheme.

FIG. 3 depicts an illustrative timing diagram 300 of a PWM switching pattern of switch control signals $S1_{CTL}$, $S2_{CTL}$, $S3_{CTL}$, $S4_{CTL}$, $S5_{CTL}$, $S6_{CTL}$, $S7_{CTL}$, and $S8_{CTL}$, and of a primary current (iL), primary (Vp) and secondary (Vs) voltages of DAB converter 114, in accordance with controlling DAB converter 114 by a TPS modulation scheme and boost condition where Vs is greater than Vp. TPS modulation involves controlling first duty ratio D1 of primary side switches S1, S2, S3, and S4, second duty ratio D2 of secondary side switches S5, S6, S7, and S8, and phase shift $\phi_f$ between Vp and Vs, relative to the switching period (e.g., the outer phase shift angle). As understood, first duty ratio D1 corresponds to first inner phase shift angle α1 of primary side bridge 220 (relative to the switching period), while second duty ratio D2 corresponds to second inner phase shift angle α2 of secondary side bridge 222 (relative to the switching period). As shown, in the boost condition, primary side bridge 220 switches on at zero current (ZCS), then after a time (D1−D2*Ts), secondary side bridge 222 switches on and the primary current (iL) starts to reduce. At time D1*Ts/2, both primary side bridge 220 and secondary side bridge 222 switch on at zero current (ZCS). That is, under control of the illustrated TPS modulation scheme, two current plateaus 301a, 301b in the primary current (iL) are generated to help achieve ZVS and ZCS. However, due to any number of reasons (e.g., circuit parameter uncertainties, circuit parameter variation, non-ideal switching), the level of the current plateaus may change, which may cause DAB 114 to lose ZVS or partially lose ZVS. In addition, although two current plateaus 301a, 301b may provide ZCS, which may reduce turn-off losses for certain silicon-based insulated-gate bipolar transistors (IGBTs), ZCS may increase switching losses when a complementary switch of a same phase leg of DAB converter 114 turns on (e.g., due to energy stored by the output capacitance of the switch discharging into the switch). Furthermore, ZCS may significantly reduce the turn-off time of wide bandgap (WBG) based power semiconductors or other MOSFET switches, thereby also increasing switching losses. Therefore, for DAB 114 including WBG based power semiconductors (e.g., gallium nitride (GaN), silicon carbide (SiC) based semiconductors, etc.) or certain other types of switches (e.g., MOSFETs), the illustrated TPS modulation scheme may limit the power efficiency rating of DAB converter 114. Accordingly, for DAB 114 including WBG based power semiconductors or certain other types of switches, it would be advantageous to extend ZVS and prevent ZCS.

Figure 4:
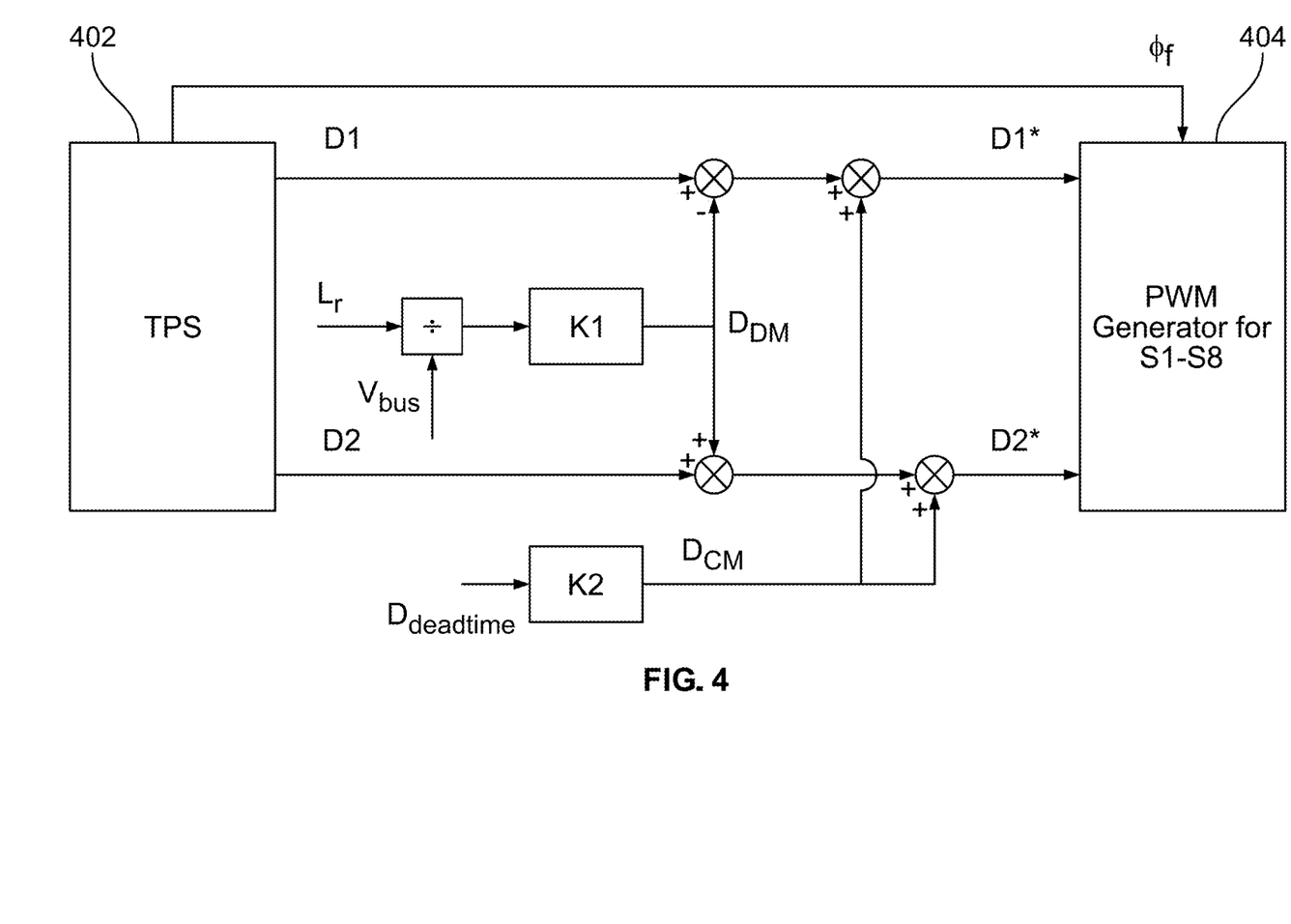
FIG. 4 is an illustrative block diagram of control circuitry for implementing a control process for a DAB converter, in accordance with some embodiments of the present disclosure.

FIG. 4 is an illustrative block diagram of control circuitry for implementing a control process for DAB converter 114, in accordance with some embodiments of the present disclosure. The control process may be implemented by control circuitry 112 of FIG. 1. As shown, control variables (D1, D2, and ϕ$_f$) of TPS modulation scheme 402 for DAB converter 114 may be determined. For example, the control variables (D1, D2, and ϕ$_f$) may be retrieved from a look-up table for DAB converter 114. For example, based on a detected output voltage (V$_O$) of DAB converter 114 (e.g., via second input port 212 (V$_{OUT\ Probe}$)), the control circuitry may determine target control variables (D1, D2, and ϕ$_f$) associated with a desired output current. In some embodiments, the look-up table may be generated offline before operation of DAB converter 114 according to any suitable model. In some embodiments, the control variables in the look-up table may be optimized for one or more conditions. For example, the control variables may be optimized in order to minimize conduction losses.

As shown, the control circuitry may modify first duty ratio D1 and second duty ratio D2 by adjusting at least one of differential mode (DM) adjustment variable D$_{DM}$ and common mode (CM) adjustment variable D$_{CM}$ in order to achieve ZVS while avoiding ZCS. As shown, DM adjustment variable D$_{DM}$ is determined by dividing inductance (Lr), which is the leakage inductance of transformer 218 including the inductance of serial inductor 216, by a detected bus voltage (V$_{bus}$) of DAB converter 114. The detected bus voltage V$_{bus}$ may be selected among the voltage detected at first input port 210 (i.e., the primary bus voltage of primary side bridge 220) and the voltage detected by and a secondary side bridge 222 at second input port 212 (i.e., the secondary bus voltage of secondary side bridge 222), based on the voltage having the smaller voltage fluctuations among the primary bus voltage and the secondary bus voltage. Depending on the voltage that is selected, a correction factor based on the operation of DAB converter 114 may be applied (e.g., to compensate for any voltage buck/boost between the primary and secondary bus voltage). A result of dividing inductance Lr by V$_{bus}$ may be multiplied by a first gain value K1 to DM adjustment variable D$_{DM}$. That is, DM adjustment variable D$_{DM}$ is adjusted based on the detected bus voltage V$_{bus}$. CM adjustment variable D$_{CM}$ is a product of the deadtime D$_{deadtime}$ and a second gain value K2 and may adjust the primary current iL without affecting power. The first gain value K1, the second gain value K2, and the deadtime D$_{deadtime}$ may be determined in advance to obtain the desired operation of DAB converter 114, as explained in further detail with respect to FIG. 5. For example, the first gain value K1, the second gain value aK2, and the deadtime D$_{deadtime}$ may be determined based on the hardware of DAB converter 114 and to account for worst case conditions across a range of voltages (e.g., to achieve the desired operating conditions). As shown, modified first duty ratio D1*=D1−D$_{DM}$+D$_{CM}$, while D2*=D2+D$_{DM}$+D$_{CM}$. In some embodiments, phase shift ϕ$_f$ may remain unchanged, thereby improving efficiency of DAB converter 114, without changing the power output. Switch control signals S1$_{CTL}$−S8$_{CTL}$ for DAB converter 114 may be generated based on the modified control variables (D1*, D2*, and ϕf).

Figure 5:
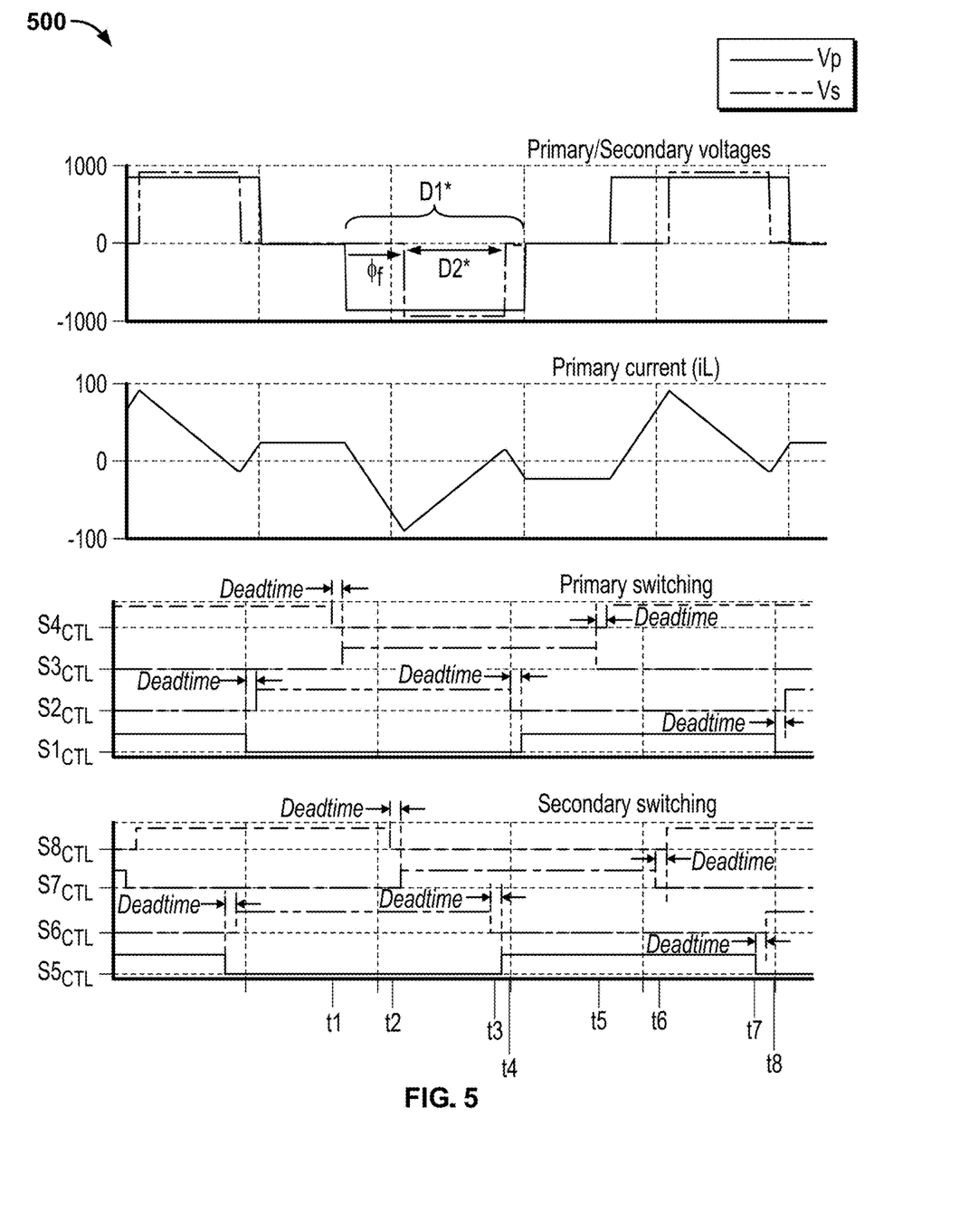
FIG. 5 depicts an illustrative timing diagram of a PWM switching pattern of switch control signals, and of primary current ($i_L$), primary voltage (Vp), and secondary voltage (Vs) of a DAB converter, in accordance with some embodiments of the present disclosure.

FIG. 5 depicts an illustrative timing diagram 500 of a PWM switching pattern of switch control signals S1$_{CTL}$, S2$_{CTL}$, S3$_{CTL}$, S4$_{CTL}$, S5$_{CTL}$, S6$_{CTL}$, S7$_{CTL}$, and S8$_{CTL}$, and of primary current (i$_L$), primary voltage (Vp), and secondary voltage (Vs) of DAB converter 114, in accordance with some embodiments of the present disclosure. PWM generator 404 may generate switch control signals S1$_{CTL}$−S8$_{CTL}$ based on the modified control variables (D1*, D2*, and ϕ$_f$) discussed above with respect to FIG. 4. As shown, the modified control variables D1*, D2*, and ϕ$_f$ control operation of DAB converter 114, such that: (1) at each rising edge of Vp (e.g., times t4 and t5), the primary current iL is negative; (2) at each falling edge of Vp (e.g., times t1 and t8), the primary current iL is positive; (3) at each rising edge of Vs (e.g., times t3 and t6), the primary current iL is positive; and (4) at each falling edge of Vs (e.g., times t2 and t7), the primary current iL is negative. This operation of DAB converter 114 extends ZVS for switches S1-S8, while avoiding ZCS, as explained in greater detail below.

As shown in FIG. 5, at each time a switch is turned off, the primary current iL is in such a direction so as to cause the anti-parallel diode of the opposite switch (e.g., the complementary switch or interlocked switch) to conduct, even before the opposite switch receives a control signal to turn on (e.g., after the deadtime D$_{deadtime}$) elapses. When the anti-parallel diode of the complementary switch conducts, it causes the transformer voltage to change to the opposite polarity and the current (primary current iL) to start charging transformer 218. Thus, the voltage across the switch is clamped to zero, so that when the switch control signal for the switch is received, the switch sees zero voltage (e.g., ZVS). That is, the primary current iL discharges energy stored by the output capacitance of the switch, so that the stored energy is discharged into transformer 218 instead of the switch, thereby reducing switching loss of the switch. For example, at time t1, switch control signal S4$_{CTL}$ switches the logic level of switch S4 from high to low. Because a ZVS condition is provided, the anti-parallel diode of switch S3 conducts, and the primary voltage Vp switches to negative and primary current iL starts charging (decreasing), which discharges energy stored by the output capacitance of switch S3 into transformer 218 instead of switch S3 (as heat). When the anti-parallel diode of switch S3 conducts, the voltage across switch S2 is clamped to zero, so when switch control signal S3$_{CTL}$ switches the logic level of switch S3 from low to high, switch S3 sees zero voltage (e.g., a ZVS condition). In contrast, in conventional operation of DAB converters where ZVS is not provided, the anti-parallel diode of the complementary switch (e.g., switch S3) does not conduct when the switch (e.g., switch S4) receives the switch control signal (e.g., S4$_{CTL}$) to switch from high to low and switching losses are increased.

In some embodiments, D$_{deadtime}$ (e.g., the time between the switch control signals for complementary switches) is selected so that there is sufficient time for the energy stored by the output capacitance of the switch to discharge, without increasing conduction loss (e.g., by having excess time after the energy stored by the output capacitance is discharged). In some embodiments, D$_{deadtime}$ is 400 ns. It should be understood that FIG. 5 is not to scale and that the length of illustrated D$_{deadtime}$ is exaggerated for understanding.

The other complementary switches operate in a similar manner as switches S3 and S4 described above. For example, as shown, at each of times t2, t3, t4, t5, t6, t7, and t8, based on the modified control variables (D1*, D2*, and $\phi_f$), primary current iL is such that energy stored by the output capacitance of the complementary switches is discharged into transformer 218, before the complementary switches receive a switch control signal to turn on, thereby extending ZVS and reducing switching losses of DAB converter 114.

Figure 6:
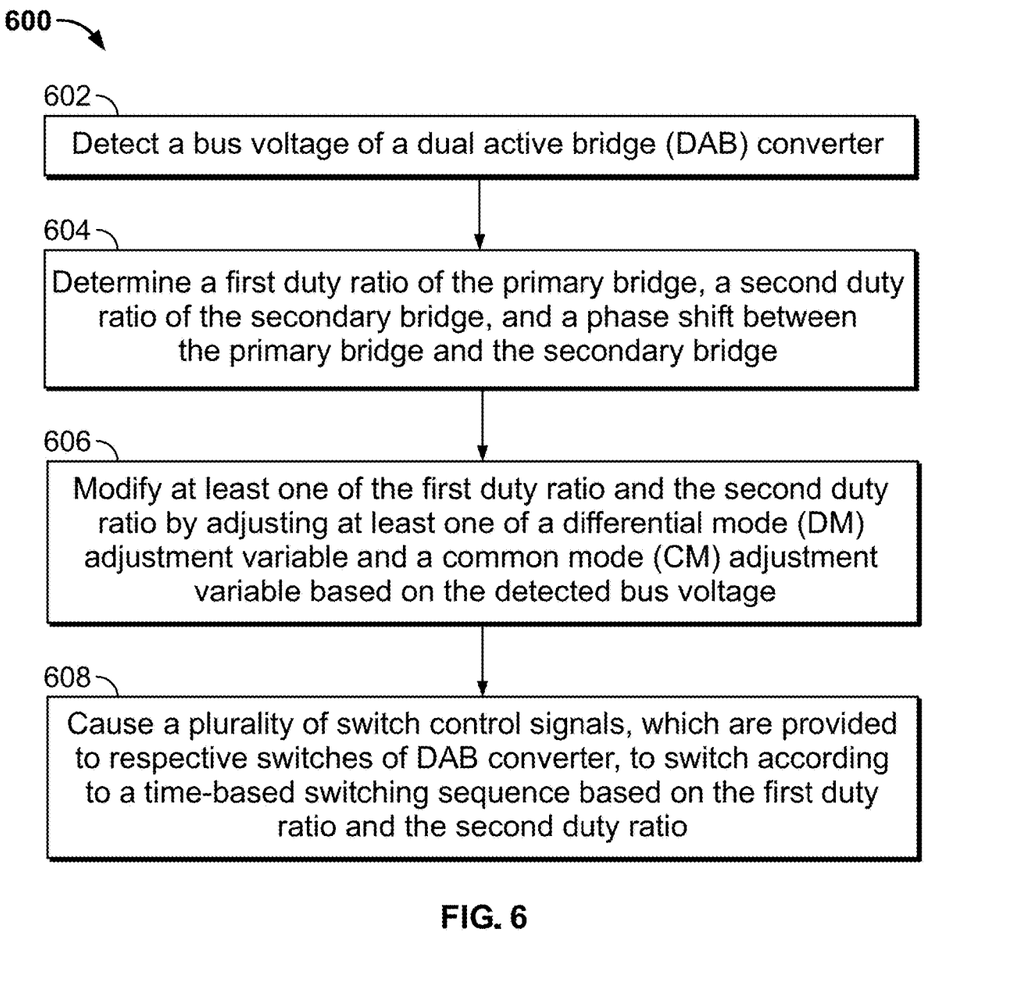
FIG. 6 depicts an illustrative flowchart of the control process of FIG. 4, in accordance with some embodiments of the present disclosure.

FIG. 6 depicts an illustrative flowchart 600 of the control process of FIG. 4, in accordance with some embodiments of the present disclosure. At 602, control circuitry 112 detects a bus voltage of DAB converter 114. The detected bus voltage may be either of the input voltage (V$_{IN}$) of DAB converter 114 detected via first input port 210 (V$_{IN\ Probe}$) or the output voltage (V$_O$) of DAB converter 114 detected via second input port 212 (V$_{OUT\ Probe}$). In some embodiments, both the input voltage (V$_{IN}$) and the output voltage (V$_O$) of DAB converter 114 are detected and the bus voltage having smaller fluctuations among the input voltage (V$_{IN}$) and the output voltage (V$_O$) is selected as the bus voltage of DAB converter 114. In some embodiments, the selected one of the input voltage (V$_{IN}$) and the output voltage (V$_O$) may be adjusted by a ratio of the input voltage (V$_{IN}$) to the output voltage (V$_O$).

At 604, control circuitry 112 determines a first duty ratio (D1) of primary side bridge 220, a second duty ratio (D2) of secondary side bridge 222, and a phase shift ($\phi_f$) between primary side bridge 220 and secondary side bridge 222. In some embodiments, the first duty ratio (D1), the second duty ratio (D2), and the phase shift ($\phi_f$) are retrieved from a look-up table, based on the detected output voltage (V$_O$) of DAB converter 114 and the desired output current or desired output power.

At 606, control circuitry 112 modifies at least one of the first duty ratio (D1) and the second duty ratio (D2) by adjusting at least one of a differential mode (DM) adjustment variable D$_{DM}$ and a common mode (CM) adjustment variable D$_{CM}$, based on the detected bus voltage. For example, the DM adjustment variable D$_{DM}$ may be adjusted based on the detected bus voltage, a leakage inductance of transformer 218 (including serial inductance of inductor 216), and a first gain (K1), while the CM adjustment variable D$_{CM}$ may be adjusted based on the deadtime D$_{deadtime}$ of DAB converter 114 and a second gain (K1). In some embodiments, the first gain (K1), the second gain (K2), and the deadtime D$_{deadtime}$ may be set in advance to obtain the desired operation of DAB converter 114, as described above with reference to FIGS. 4 and 5. For example, increasing the DM adjustment variable D$_{DM}$ may decrease the first duty ratio D1 and increase the second duty ratio D2, while increasing the CM adjustment variable D$_{CM}$ may increase both the first duty ratio D1 and the second duty ratio D2. In some embodiments, the phase shift ($\phi_f$) is not modified. In some embodiments, the first gain is set in advance to obtain the desired operation of DAB converter 114, as described above with reference to FIGS. 4 and 5. For example, the first gain (K1), the second gain (K2), and D$_{deadtime}$ may be set to extend ZVS and avoid ZCS.

At 608, control circuitry 112 causes a plurality of switch control signals (e.g., switch control signals S1$_{CTL}$-S8$_{CTL}$), which a provided to respective switches S1-S8, to switch according to a time-based switching sequence based the phase shift ($\phi_f$), and the modified first duty ratio and second duty ratio.

The processes discussed above are intended to be illustrative and not limiting. One skilled in the art would appreciate that the steps of the processes discussed herein may be omitted, modified, combined and/or rearranged, and any additional steps may be performed without departing from the scope of the invention.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method comprising:
   detecting a bus voltage of a dual active bridge (DAB) converter, wherein the DAB comprises a primary bridge, a secondary bridge, and a transformer coupling the primary bridge to the secondary bridge;
   determining a first duty ratio of the primary bridge and a second duty ratio of the secondary bridge;
   modifying at least one of the first duty ratio and the second duty ratio by adjusting at least one of a differential mode (DM) adjustment variable and a common mode (CM) adjustment variable based on the detected bus voltage; and
   causing a plurality of switch control signals, which are provided to respective switches of the primary bridge and the secondary bridge, to switch according to a time-based switching sequence based on the first duty ratio and the second duty ratio.

2. The method of claim 1, wherein modifying at least one of the first duty ratio and the second duty ratio comprises modifying at least one of the first duty ratio and the second duty ratio such that a current of the transformer changes polarity before the secondary bridge switches off.

3. The method of claim 1, wherein:
   the DM adjustment variable is based on the detected bus voltage, a leakage inductance of the transformer, and a first gain; and
   the CM adjustment variable is based on a deadtime of the DAB converter and a second gain.

4. The method of claim 1, wherein the DM adjustment variable is a product of a first gain and a ratio of a leakage inductance of the transformer to the detected bus voltage.

5. The method of claim 1, wherein the CM adjustment variable is a product of a second gain and a dead time between interlocked switches of the primary bridge or the secondary bridge.

6. The method of claim 1, wherein the secondary bridge switches off before the primary bridge while a polarity of a current of the transformer is opposite to a polarity of a secondary bus voltage of the secondary bridge.

7. The method of claim 1, wherein modifying at least one of the first duty ratio and the second duty ratio comprises modifying at least one of the first duty ratio and the second duty ratio to avoid zero current switching (ZCS) of the DAB converter.

8. The method of claim 1, wherein modifying at least one of the first duty ratio and the second duty ratio comprises modifying at least one of the first duty ratio and the second duty ratio such that:
   at each rising edge of a primary side voltage of the transformer, a current of the transformer is negative;
   at each falling edge of the primary side voltage of the transformer, the current of the transformer is positive;
   at each rising edge of a secondary side voltage of the transformer, the current of the transformer is positive; and
   at each falling edge of the secondary side voltage of the transformer, the current of the transformer is negative.

9. The method of claim 1, wherein detecting the bus voltage comprises:
   detecting a primary bus voltage of the primary bridge;
   detecting a secondary bus voltage of the secondary bridge; and
   selecting, as the detected bus voltage, the bus voltage having smaller voltage fluctuations among the primary bus voltage and the secondary bus voltage.

10. A method comprising:
   detecting a bus voltage of a dual active bridge (DAB) converter, wherein the DAB comprises a primary bridge, a secondary bridge, and a transformer coupling the primary bridge to the secondary bridge;
   determining when to turn off the primary bridge and the secondary bridge based on the detected bus voltage such that zero voltage switching (ZVS) is achieved for one or more switches of the primary bridge and the secondary bridge, comprising:
      determining a differential mode (DM) adjustment variable and a common mode (CM) adjustment variable; and
      modifying at least one of a first duty ratio of the primary bridge and a second duty ratio of the secondary bridge based on the DM adjustment variable and the CM adjustment variable; and
   causing a plurality of switch control signals, which are provided to respective switches of the primary bridge and the secondary bridge, to switch according to a time-based switching sequence based on the determination of when to turn off the primary bridge and the secondary bridge.

11. The method of claim 10, further comprising switching off the secondary bridge before switching off the primary bridge.

12. A system for controlling a dual active bridge (DAB) converter having a primary bridge, a secondary bridge, and a transformer coupling the primary bridge to the secondary bridge, the system comprising:
   a port of the DAB converter;
   a plurality of output ports coupled to switches of the DAB converter; and
   control circuitry coupled to the port and the plurality of output ports and configured to:
      detect a bus voltage of the DAB converter via the port;
      determine a first duty ratio of the primary bridge and a second duty ratio of the secondary bridge;
      modify at least one of the first duty ratio and the second duty ratio by adjusting at least one of a differential mode (DM) adjustment variable and a common mode (CM) adjustment variable based on the detected bus voltage; and
      cause a plurality of switch control signals, which are provided to respective switches of the primary bridge and the secondary bridge, to switch according to a time-based switching sequence based on the first duty ratio and the second duty ratio.

13. The system of claim 12, wherein the control circuitry is configured to modify at least one of the first duty ratio and the second duty ratio by modifying at least one of the first duty ratio and the second duty ratio such that a current of the transformer changes polarity before the secondary bridge switches off.

14. The system of claim 12, wherein each of the switches of the DAB converter is a gallium nitride (GaN) based semiconductor or a silicon carbide (SiC) based semiconductor.

15. The system of claim 12, wherein:
   the DM adjustment variable is a product of a first gain and a ratio of a leakage inductance of the transformer to the detected bus voltage; and
   the CM adjustment variable is a product of a second gain and a deadtime between interlocked switches of the primary bridge or the secondary bridge.

16. The system of claim 12, wherein the secondary bridge switches off before the primary bridge while a polarity of a current of the transformer is opposite to a polarity of a secondary bus voltage of the secondary bridge.

17. The system of claim 12, wherein the control circuitry is configured to modify at least one of the first duty ratio and the second duty ratio by modifying at least one of the first duty ratio and the second duty ratio to avoid zero current switching (ZCS) of the DAB converter.

18. The system of claim 12, wherein the control circuitry is configured to modify at least one of the first duty ratio and the second duty ratio by modifying at least one of the first duty ratio and the second duty ratio such that:
   at each rising edge of a primary side voltage of the transformer, a current of the transformer is negative;
   at each falling edge of the primary side voltage of the transformer, the current of the transformer is positive;
   at each rising edge of a secondary side voltage of the transformer, the current of the transformer is positive; and
   at each falling edge of the secondary side voltage of the transformer, the current of the transformer is negative.

19. The system of claim 12, wherein the control circuitry is configured to detect the bus voltage by:
   detecting a primary bus voltage of the primary bridge;
   detecting a secondary bus voltage of the secondary bridge; and
   selecting, as the detected bus voltage, the bus voltage having smaller voltage fluctuations among the primary bus voltage and the secondary bus voltage.

* * * * *